United States Patent [19]
Lorenz et al.

[11] 3,977,355
[45] Aug. 31, 1976

[54] LOW TIRE PRESSURE WARNING SYSTEM WITH MECHANICAL LATCHING

[75] Inventors: Edwin A. Lorenz, Flint; Manfred P. H. Schlanzky, Alpena, both of Mich.

[73] Assignee: General Motors Corporation, Detroit, Mich.

[22] Filed: Nov. 12, 1975

[21] Appl. No.: 630,957

[52] U.S. Cl. ............................. 116/34 R; 73/146.5; 340/58
[51] Int. Cl.² ........................................ B60C 23/04
[58] Field of Search ................. 73/146.5; 116/34 R, 116/114 PV; 340/58

[56] References Cited
UNITED STATES PATENTS

| | | | |
|---|---|---|---|
| 2,967,508 | 1/1961 | Hovorka | 116/34 R |
| 3,638,180 | 1/1972 | Lejeune | 340/58 |
| 3,872,268 | 3/1975 | Hata | 116/34 R |

*Primary Examiner*—Donald O. Woodiel
*Attorney, Agent, or Firm*—Warren D. Hill

[57] ABSTRACT

An air switch senses abnormally low pressure in a tire and provides a pneumatic signal to an actuator which moves a magnet from a normal position to a warning position. An electrical detection system senses that the magnet is in a warning position and provides a low pressure warning signal to the vehicle operator. The actuator contains a mechanical latch to assure that the magnet remains in a warning position even if the pneumatic signal should cease. A reset feature allows the latch to be disengaged to return the actuating mechanism to normal condition when proper tire inflation pressure has been restored.

3 Claims, 6 Drawing Figures

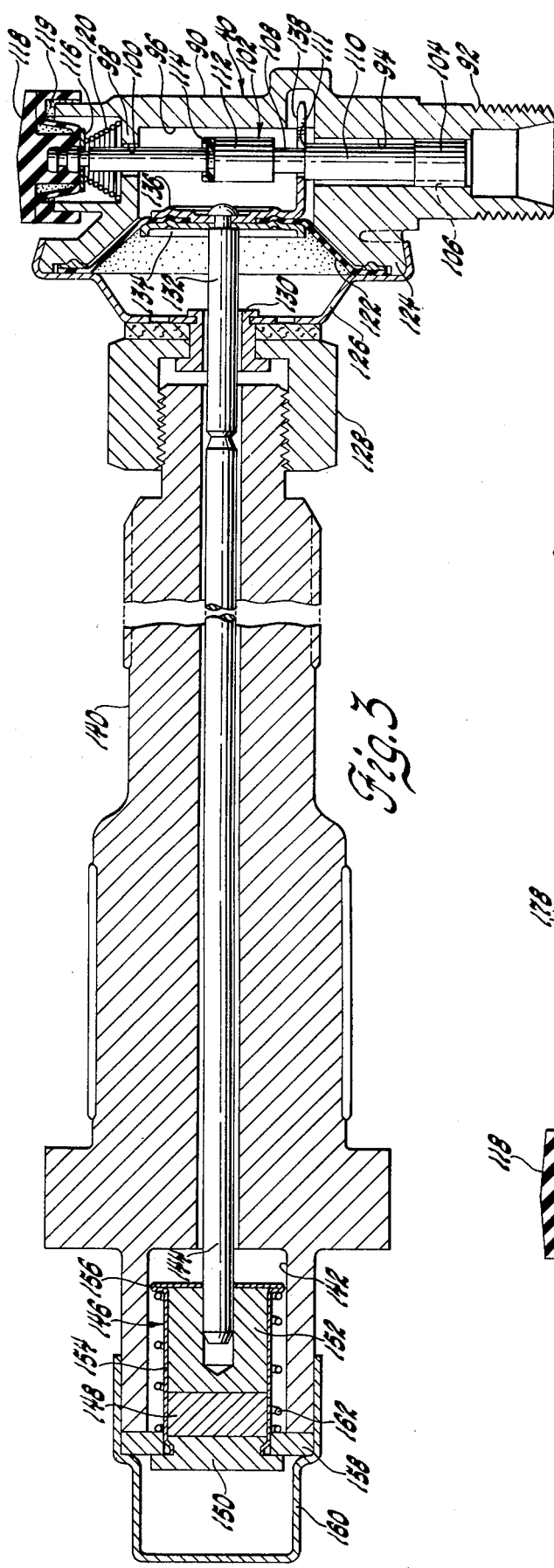

3,977,355

LOW TIRE PRESSURE WARNING SYSTEM WITH MECHANICAL LATCHING

This invention relates to low tire pressure warning systems and especially to such systems having a latch mechanism to maintain the system in a warning condition once such a condition has been attained.

It has been proposed to equip pneumatic tire vehicles with systems to alert the vehicle operator when the pressure of a tire has dropped a certain amount below its normal operating pressure. In one type of system, a wheel mounted air switch responsive to tire pressure produces a pneumatic signal when the tire pressure falls below its normal range and that signal activates an actuator which extends a magnet into a warning position. Upon wheel rotation, the magnet periodically passes a chassis mounted electrical sensor which provides a warning signal to the vehicle operator. In the event the tire loses essentially all its pressure while the vehicle is stationary, an electrical signal would not be generated even though the actuator was energized.

It is therefore desirable to provide a mechanism which stores the information of the low tire pressure even so that the signal to the operator will be produced whenever the vehicle is put into motion.

It is therefore a general object of this invention to provide a latch in a low tire pressure warning system to indefinitely store the information of a low pressure event.

It is another object of this invention to provide in a tire pressure warning system, a mechanical latch to maintain the system in a warning condition once it has been energized to the warning condition.

The invention is carried out by providing in a low pressure tire warning system an actuator which has a linearly movable element which is moved from a normal position to a warning position when low tire pressure occurs, and a latch mechanism cooperating with the actuator element to hold the element in a warning position. The invention further contemplates such a latch mechanism which has a manual reset feature to disengage the latch mechanism and restore the system to normal condition when tire inflation pressure is restored.

The above and other advantages will be made more apparent from the following specification taken in conjunction with the accompanying drawings wherein like reference numerals refer to like parts and wherein;

FIG. 3 is a sectional view of the actuator of the system of FIG. 1;

FIG. 4 is a section view of a portion of the actuator of FIG. 3 in latched condition;

FIG. 5 is a sectional view of another form of an actuator according to the invention;

FIG. 6 is a view taken along lines 6—6 of the actuator of FIG. 5.

Figure 1:
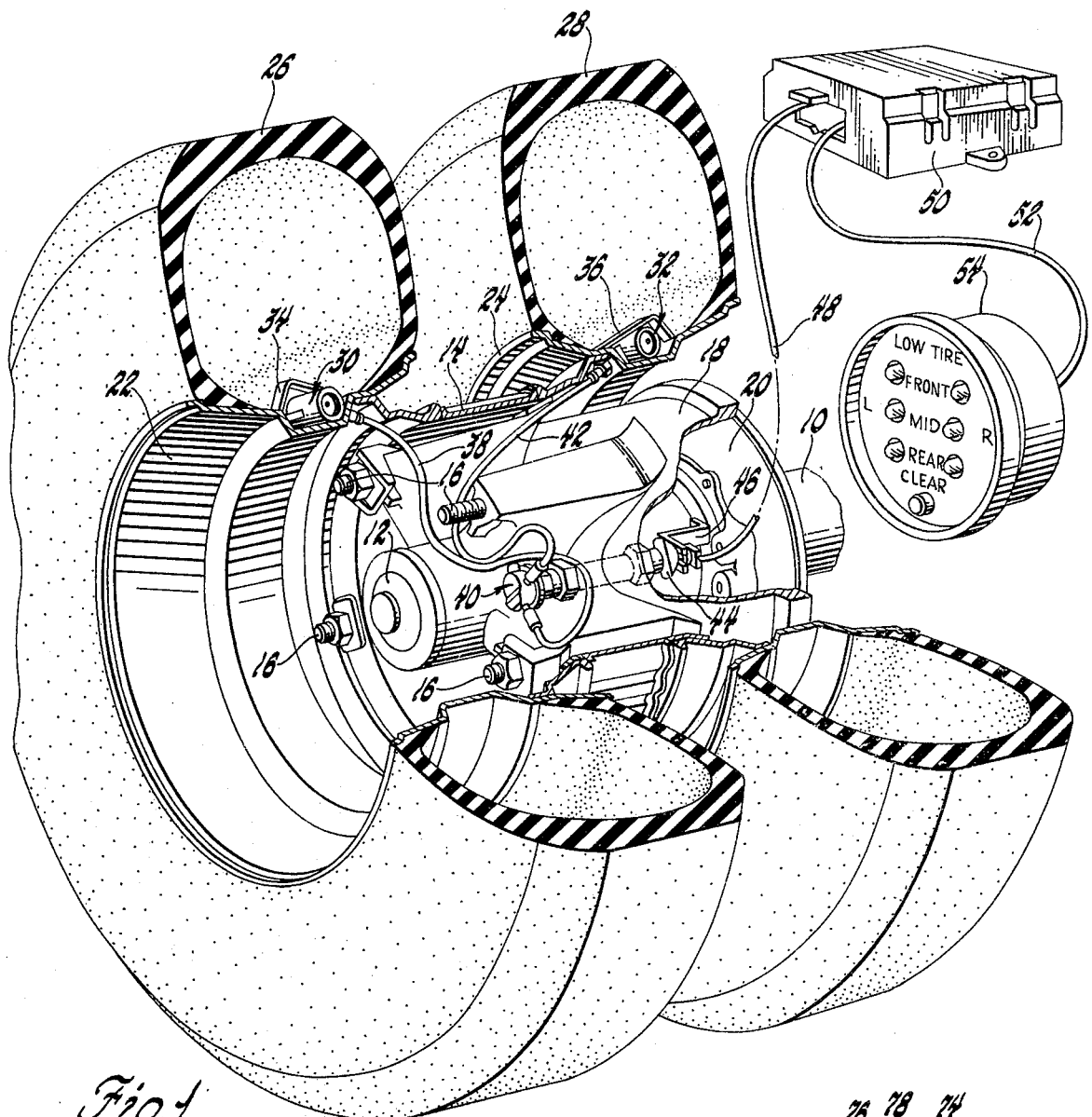
FIG. 1 is a perspective view of a dual wheel and tire assembly illustrating the low pressure warning system of this invention.

Referring to FIG. 1, there is illustrated a dual wheel assembly of conventional construction which may be used, for example, on a truck or bus. The invention is described with respect to such a dual wheel system for illustration purposes only, it being apparent that the tire pressure warning system of this invention may be readily adapted for use with single or multiple tired wheels.

An axle housing 10 is connected to the vehicle chassis for supporting the vehicle wheel assembly. A rotatable hub 12 is mounted on the axle housing 10 by means of suitable bearings and is driven by a rotatable axle (not shown) extending through the axle housing 10. A wheel 14 is connected to the hub 12 by bolt assemblies 16 which also secure a brake drum 18 to the hub 12. A plate member 20 is mounted on the axle housing 10 within the rim of the brake drum 18 and may support the brake shoes which cooperate with the brake drum 18 in the conventional manner. A rim 22 and a rim 24 are each mounted on the wheel 14 and inflatable pneumatic tires 26 and 28 are mounted on the rims 22 and 24, respectively. The tires 26 and 28 are inflated in the usual manner through a valve stem (not shown) to a desired pressure.

A low pressure air switch assembly 30 is mounted on the rim 22 extending into the tire 26 to monitor the air pressure therein. A low pressure air switch assembly 32 is mounted on the rim 24 extending into the tire 28 to monitor the tire pressure therein. Shields 34 and 36 are provided for protecting the air switch assemblies 30 and 32, respectively, during assembly of the tires 26 and 28 on the rims 22 and 24.

An air hose 38 couples the output of the low pressure air switch assembly 30 to one air inlet of an actuator 40 and an air hose 42 couples the output of the low pressure air switch assembly 32 to a second air inlet of the actuator 40. The actuator 40 is mounted on the face of the brake drum 18 so as to extend laterally therethrough.

A sensor 44 is mounted to the plate member 20 by means of a bracket assembly 46 such that the sensor 44 is positioned adjacent a path traced by the end of the actuator 40. An electric cable 48 couples the sensor 44 to a signal processor 50 whose output is coupled by a cable 52 to an instrument panel display 54.

Each of the low pressure air switches 30 and 32 are responsive to the air pressures within the respective tires 26 and 28 and function to couple the air within those tires to the actuator 40 via the respective air hoses 38 and 42 when the pressure sensed thereby decreases to a specified level below a reference pressure. The air under pressure from the respective tire 26 or 28 operates the actuator 40 which generates an external magnetic field. The sensor 44 is responsive to the magnetic field produced by the actuator 40 to generate an electric signal which is coupled to the signal processor 50 through the cable 48. The signal processor 50 supplies a signal via the cable 52 to energize an appropriate indicator in the instrument panel display 54 to provide an indication of the decreased tire pressure.

Figure 2:
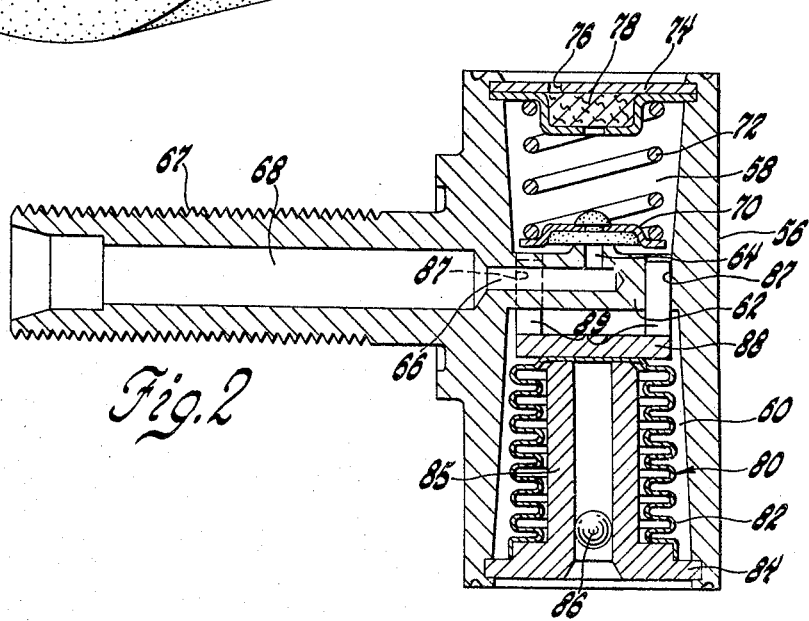
FIG. 2 is a sectional view of one of the low pressure air switches of FIG. 1.

Referring to FIG. 2, there is illustrated a low pressure air switch representing each of the air switches 30 and 32, it being understood that the switches 30, 32 are identical. The low pressure air switch of FIG. 2 includes a housing 56 forming two opposed cavities 58 and 60 having a common wall 62 therebetween. A bore 64 extends from the cavity 58 into the wall 62. A transverse bore 66 extends into the wall 62 and intersects the bore 64. A stem 67 aligned with the bore 66 extends laterally from the housing 56 and contains a counterbore 68 communicating with the bore 66, it being adapted for connection to one of the hoses 38 or 42. As shown in FIG. 1, the housing is located within the tire and the stem 67 extends out through the rim 22.

A valve closure 70 comprising an annular metallic cup filled with resilient material is disposed over the bore 64 and biased against the bore opening by a spring 72. The other end of the spring is seated against a closure member 74 which is crimped into the opening of cavity 58. An aperture 76 extending through the closure member is covered by a filter 78 which allows air from the tire interior to enter the cavity 58. The cavity 60 contains a bellows assembly 80 which includes a bellows 82 sealed to an annular base member 84 that has a tubular portion 85 projecting into the bellows. The bellows is precharged to a specified pressure corresponding to the desired tire inflation pressure and a ball 86 is pressed into the tubular portion of the base member 84 to seal the bellows. The base member 84 is crimped into the opening of the cavity 60.

The portion of the bellows 82 furthest from the base 84 therefore comprises a movable wall which carries a push rod assembly 88 having rods 89 extending through apertures 87 in the wall 62 and movable into engagement with the valve closure 70.

In operation the bore 68 would normally be at atmospheric pressure so that the spring 72 as well as the tire pressure would bias the valve closure 70 against the bore 64 in sealing engagement therewith. The tire pressure is communicated through the filter 78 and the aperture 87 to the chamber 60. When the tire pressure falls below the bellows pressure by a certain amount, the bellows extend sufficiently to unseat the valve closure 70 through the action of the push rod assembly 88 thereby allowing a portion of the tire inflation air to pass under pressure through the bores 64 and 68 and hose 38 or 42 to the actuator 40 thereby providing a pneumatic signal to the actuator.

FIG. 3 shows the actuator 40 which includes a housing 90 having a hose coupling 92 extending from one side thereof for connection with the hose 38 and another coupling, not shown in FIG. 3, for connection with the hose 42. A bore 94 through the coupling 92 and the housing 90 communicates with a cavity 96 in the housing and a web 98 contains another bore 100 aligned with the bore 94. A cylindrical cavity is formed outboard of the web 98. A detent rod 102 slidably fits in the bores 94 and 100 and has an enlarged guide portion 104 engaging the bore 94. A cutout air passage 106 in the guide portion 104 allows air pressure from the air hose 38 to enter the cavity 96. The detent rod 102 includes a neck portion 108 of reduced diameter within the cavity 96 which is bounded on one side by a rod portion 110 of larger diameter defining a shoulder 111. A portion of the detent rod extending through the bore 100 is of smaller diameter than the bore to provide a small air passage and an enlarged portion 112 of the rod carries a ring 114 of resilient material to form a seal around the bore 100 when the actuator is moved to a warning position. The small air passage through bore 100 provides a restricted vent to atmosphere to relieve any residual air pressure from the cavity 96 when the detent rod 102 is in the normal position, as shown. However, the vent is not large enough to prevent pressurization of the cavity 96 when a pneumatic signal is received from air switch 30 or 32.

The upper end of the detent rod 102, as shown in FIG. 3, has a spring retainer 116 and a combination dust cover and push button 118 secured thereto. An air passage 119 in the dust cover provides a vent to atmosphere. A spring 120 compressed between the retainer 116 and the web 98 urges the detent rod upwardly. A diaphragm 122 having its periphery clamped between a lip 124 of the housing 90 and a cover 126 encloses the cavity 96. A nut 128 is secured to the cover 126 by a hollow rivet 130. A rod 132 extending through the hollow rivet has one end staked to a pair of washers 134 and 136 which clamp the central portion of the diaphragm 122. One edge of the washer 136 has a bifurcated tang 138 extending across the cavity 96 and straddling the neck portion 108 of the detent rod when the actuator is in normal position as shown.

In operation, the shoulder 111 of the detent rod engages the tang 138 to hold the detent rod in normal position against the force of the spring 120. When, however, the air valve 30 or 32 transmits a pneumatic signal to the actuator, the cavity 96 is pressurized causing the diaphragm 122 and the rod 132 to move to the left as shown in FIG. 4 thereby disengaging the tang 138 from the shoulder portion 110 allowing the detent rod 102 to shift upwardly under the action of the spring 120 causing the resilient ring 114 to seal the bore 100 to prevent leakage therethrough. That movement of the detent rod 102 causes the enlarged rod portion 110 to engage the end of the tang 138 thereby latching the diaphragm 122 and rod 132 in the left or warning position.

A hollow bolt 140 made of magnetic material has one end threaded to the nut 128 and has a cavity 142 formed in the other end. A push rod 144 extends through the bolt 140 to engage rod 132 at one end and is press fit into a magnet assembly 146 at the other end. The magnet assembly 146 comprises a magnet 148 having a pole piece 150 secured at one face thereof and a pole piece 152 secured to the other face thereof, the assembly being retained in an integral unit by a non-magnetic shell 154 which has a radially extending flange 156 at its inner end. The magnet assembly is positioned on the rod 144 so that it is normally maintained within the cavity 142. Ring 158 of magnetic material is secured to the end of the bolt 140 by a cap 160 of non-magnetic material. The pole piece 150 has a lip extending radially into overlapping contact with the ring 158 so that in normal position a closed magnetic path is formed from the magnet to the pole piece 150, the ring 158, the portion of the bolt 140 surrounding the cavity 142 and the pole piece 152.

The magnetic attraction between the pole piece 150 and the ring 158 tends to latch the magnet in the normal position. In addition, a coil spring 162 surrounding the magnet assembly and compressed between the flange 156 thereof and the ring 158 biases the magnet assembly as well as diaphragm 122 and rod 132 into normal position. When, however, the diaphragm 122 is actuated by the pneumatic signal from the air switch, the magnet assembly is moved to the left overcoming the magnetic latching force and the spring 162 so that the magnetic flux is no longer concentrated in the closed flux path and an external magnetic field is generated. Then when the wheel is rotated, the external magnetic field triggers the sensor 44 which as described above generates a signal to energize an indicator in the display 54.

It will be seen that even if the wheel is not rotating at the time the low pressure condition in the tire occurs, the corresponding air switch will energize the actuator 40 causing the magnet assembly 146 to be moved to warning position. Simultaneously, the detent rod 102 shifts upwardly so that the shoulder portion 110 engages the tang 138 to latch the magnet assembly in the warning position indefinitely, even if the tire loses all its pressure and there is no further pressure signal applied to the diaphragm 122. Then upon the rotation of the wheel, electrical signals will provide a warning signal to the vehicle operator. To reset the actuator after the tire has been repaired and reinflated, it is necessary only to manually depress the button 118 to shift the detent rod 102 to its normal position whereupon any pressure in the cavity 96 is vented through passage 119. Then the spring 162 around the magnet assembly urges the magnet assembly and the diaphragm 122 back to normal position whereupon the tang 138 engages the shoulder 111 of the detent rod to hold it in normal position.

FIGS. 5 and 6 illustrate another embodiment of an actuator with a latching provision. There a housing 170 defines a cylindrical bore 172 carrying a piston 174. A roll seal 176 is secured to one end of the piston and to the end of the housing 170 by an end cap 178 which is clamped to the seal and a flange on the housing. Couplings 180 (only one is shown) are provided to secure the hoses 38 and 42 to the end cap 178 to allow pressure from either air switch to operate on the piston 174. A rod 182 secured to the piston extends through a bore 184 in a web 186 in the housing 170. The rod includes a reduced neck section 188 bounded by shoulders. A transverse bore 190 in the web section 186 houses a sliding detent element 192 biased upwardly by a spring 194 trapped between the element 192 and the bottom of the bore 190. The detent element 192 includes a slot 196 through which the rod 182 passes. A ridge 198 extends upwardly from the bottom of the slot and is biased against the rod 182. A button 200 protruding from the top of the detent element 192 is covered by a flexible dust cover 202. When a pneumatic signal from an air switch is passed to the actuator, the piston 174 moves to the right as viewed in FIG. 5 and when the neck portion 188 of the rod 182 is aligned with the ridge 198 on the detent element, the ridge 198 will be biased into the neck portion 188 to latch the rod 182 into the extended position. A bolt and magnet assembly, like that in FIG. 3, is coupled to the actuator housing 170 although not specifically shown in FIG. 5. Thus the actuator of FIG. 5 operates in essentially the same manner as that of FIGS. 3 and 4 wherein a spring biased mechanical detent engages an abutment on the linearly movable actuating mechanism or rod 182 to latch the system in warning position thereby maintaining the magnet in warning position indefinitely. The actuator is manually reset by depressing the button 200 to remove the ridge 198 from the neck portion 180 allowing the rod to assume its normal position.

The embodiments of the invention in which an exclusive property or privilege is claimed are defined as follows:

1. A low tire pressure warning system for providing and maintaining an indication of tire pressure decrease below a normal value comprising, normally closed vlave means connected to a tire and having an inlet in communication with tire pressure, the valve having an outlet and means responsive to tire pressure for opening the valve to exhaust tire air under pressure through the outlet when tire pressure decreases below a normal value,
actuator means pneumatically connected to the outlet of said valve means including an actuator element biased to a normal position and responsive to the pressure of said tire air exhausted through the outlet for movement from the normal position to a warning position when tire pressure decreases below a normal value, and a latch mechanism responsive to movement of the actuator element to the said warning position for holding the actuator element in warning position irrespective of the continuance of the tire air pressure from the said valve outlet,
and means responsive to the actuator element in warning position to provide a low tire pressure indication.

2. A low tire pressure warning system for providing and maintaining an indication of tire pressure decrease below a normal value comprising, normally closed valve means connected to a tire and having an inlet in communication with tire pressure, the valve having an outlet and means responsive to tire pressure for opening the valve to exhaust tire air under pressure through the outlet when tire pressure decreases below a normal value,
actuator means pneumatically connected to the outlet of said valve means including an actuator element biased to a normal position and responsive to the pressure of said tire air exhausted through the outlet for movement from the normal position to a warning position when tire pressure decreases below a normal value, the actuator element including elongated means connected for longitudinal linear movement upon movement of the actuator element and having an abutment portion, and a latch mechanism comprising a detent element mounted for movement transverse to the elongated means, biasing means for moving the detent element into engagement with the abutment portion of the elongated means when the actuator element is moved to warning position for holding the actuator element in warning position irrespective of the continuance of the tire air pressure from the valve outlet,
and means responsive to the actuator element in warning position to provide a low tire pressure indication.

3. A low tire pressure warning system for providing and maintaining an indication of tire pressure decrease below a normal value comprising, normally closed valve means connected to a tire and having an inlet in communication with tire pressure, the valve having an outlet and means responsive to tire pressure for opening the valve to exhaust tire air under pressure through the outlet when tire pressure decreases below a normal value,
actuator means pneumatically connected to the outlet of said valve means including an actuator element biased to a normal position and responsive to the pressure of said tire air exhausted through the outlet for movement from the normal position to a warning position when tire pressure decreases below a normal value, the actuator element including elongated means connected for longitudinal linear movement upon movement of the actuator element and having an abutment portion, and a latch mechanism comprising a detent element mounted for movement transverse to the elongated means, the elongated means interfering with movement of the detent element to hold the detent element in normal position when the actuator element is in normal position, biasing means for moving the detent element into engagement with the abutment portion of the elongated means when the actuator element is moved to warning position for holding the actuator element in warning position irrespective of the continuance of the tire air pressure from the valve outlet, and manually operated reset means connected to the detent means for returning the detent means to normal position thereby allowing the actuator element to return to normal position, and means responsive to the actuator element in warning position to provide a low tire pressure indication.

\* \* \* \* \*